United States Patent Office 3,644,419
Patented Feb. 22, 1972

3,644,419
2,3,4,9 - TETRAHYDRO - 9 - PHENYL-OXAZIRINO-[2,3-d][1,4]BENZODIAZEPINES AND PREPARATION THEREOF
Werner Metlesics, Clifton, and Leo Henryk Sternbach, Upper Montclair, N.J., assignors to Hoffmann-La Roche Inc., Nutley, N.J.
No Drawing. Application June 19, 1967, Ser. No. 647,226, now Patent No. 3,498,973, dated Mar. 3, 1970, which is a division of application Ser. No. 267,908, Mar. 25, 1963. Divided and this application Dec. 5, 1969, Ser. No. 882,745
Int. Cl. C07d 53/06, 85/02
U.S. Cl. 260—333
1 Claim

ABSTRACT OF THE DISCLOSURE

Novel 2,3,4,9-tetrahydro - 9 - phenyl-oxazirino[2,3-d]-[1,4]benzodiazepines and preparation thereof prepared via oxidation of 2,3-dihydro-5-phenyl-1H-1,4-benzodiazepines, are described. These novel products are useful as intermediates in the preparation of 2,3-dihydro-5-phenyl-1H-1,4-benzodiazepine 4-oxides, useful as anti-convulsant agents.

CROSS REFERENCE TO RELATED APPLICATIONS

This application is a divisional application of Ser. No. 647,226 filed June 19, 1967, now Pat. No. 3,498,973, issued Mar. 3, 1970, which is a divisional application of Ser. No. 267,908, filed Mar. 25, 1963 and now abandoned.

DETAILED DESCRIPTION OF THE INVENTION

The present invention relates to novel therapeutically useful heterocyclic compounds, novel processes and novel intermediates therefore. In particular, the present invention relates to novel 2,3-dihydro-5-phenyl-1H-1,4-benzodiazepines. More particularly, the novel compounds of this invention are selected from the group consisting of compounds of the formulae:

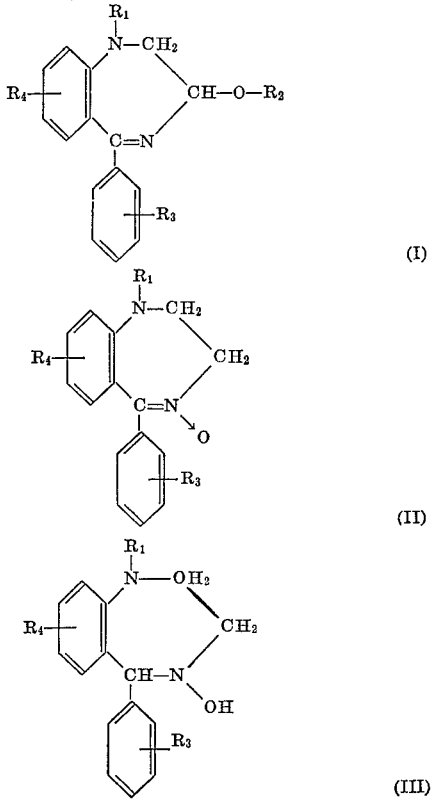

wherein $R_1$ is selected from the group consisting of hydrogen, lower alkyl, and lower alkanoyl; $R_2$ is selected from the group consisting of hydrogen, lower alkanoyl and benzoyl; $R_3$ is selected from the group consisting of hydrogen, lower alkyl, halogen, trifluoromethyl and nitro; and $R_4$ is selected from the group consisting of hydrogen, lower alkyl, halogen, trifluoromethyl, nitro and cyano.

As used above the term lower alkyl refers to both straight and branched chain saturated hydrocarbon radicals, for example, methyl, ethyl, propyl, isopropyl and the like. Similarly, the term lower alkanoyl refers to groups such as formyl, acetyl, propionyl, butyryl, isobutyryl and the like. The term halogen includes all four halogens, i.e. chlorine, bromine, fluorine and iodine, but chlorine, bromine and fluorine are particularly preferred.

A preferred embodiment of the invention are compounds wherein the substituent $R_4$ is other than hydrogen and is in the position corresponding to the 7-position of the 1,4-benzodiazepine moiety. A second preferred variation are compounds wherein $R_3$ is other than hydrogen and is in the 2'-position.

The compounds of this invention can be prepared by a variety of diverse routes which are outlined below, and more specifically illustrated in the examples to follow.

Compounds of Formula II above, i.e. 2,3-dihydro-5-phenyl-1H-1,4-benzodiazepine 4-oxides are prepared from 2,3-dihydro-5-phenyl-1H-1,4-benzodiazepines via oxidation. In order to provide for facile oxidation of the 4-position nitrogen atom, it is suitable to first protect of the 1-position nitrogen atom with an acyl protecting group, for example, a lower alkanoyl e.g. formyl or acetyl, radical. Having so protected the 1-position nitrogen atom, the so-obtained 1 - lower alkanoyl-2,3-dihydro-5-phenyl-1H-1,4-benzodiazepine can then be oxidized via utilization of various oxidizing agents known per se, for example, hydrogen peroxide or peracids. As peracids there can be used any of the conveniently available known peracid oxidizing agents, for example, peracetic acid, trifluoroperacetic acid, perbenzoic acid, perphthalic acid and persulfuric acid. The oxidation can be effected at room temperature or above or below room temperature.

The oxidation does not proceed directly to a compound of Formula II but first gives an intermediate oxaziridine of the formula:

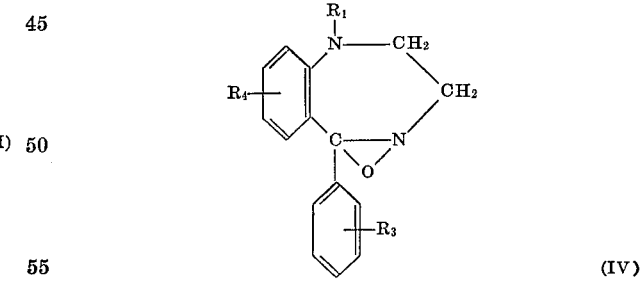

wherein $R_1$, $R_3$ and $R_4$ have the same meaning as above. These oxaziridines, which can be denoted formally as 2,3,4,9-tetrahydro - 9 - phenyl-oxazirino[2,3-d][1,4]benzodiazepines, are novel compounds and are part of this invention. They can be converted to compounds of Formula II above by being heated. The heating can be effected by heating the compounds of Formula IV per se or by heating said compounds contained in an inert solvent. Compounds of Formula II upon exposure to light are converted to compounds of Formula IV.

The above described oxidation can be effected in a variety of ways, for example, where a peracid is used, the peracid can be formed in situ via the mixing of hydrogen peroxide with a normal carboxylic acid or a functional derivative thereof, e.g. an anhydride thereof. This peracid solution can then be mixed with the above described 2,3-dihydro-5-phenyl-1H-1,4-benzodiazepine protected in the 1-position by, for example, a lower alkanoyl radical. The reaction can be effected in neutral or acidic medium. Still another method of effecting the reaction is to treat the starting material contained in acidic medium, with hydrogen peroxide. The above oxidation can be effected at room temperature or at elevated temperatures.

The novel compounds of the invention, i.e. the compounds of Formulae I–IV, are basic in nature and form acid addition salts with either organic or inorganic acids. Thus they form pharmaceutically acceptable acid addition salts with pharmaceutically acceptable acids, for example, mineral acids, such as hydrohalic acids, e.g. hydrobromic acid, hydrochloric acid and the like, nitric acid, sulfuric acid, and the like, or organic acids such as picric acid, citric acid, methanesulfonic acid, toluenesulfonic acid, or the like. Of course where the intended use of the compound is as an intermediate, the acid addition salt formed need not be pharmaceutically acceptable. Compounds of Formula II wherein $R_1$ is lower alkanoyl can be hydrolyzed to form compounds of Formula II wherein $R_1$ is hydrogen. This hydrolysis is suitably effected in the presence of alkali, advantageously, at an elevated temperature, for example, up to the reflux temperature of the reaction mixture.

Compounds of Formula II wherein $R_1$ is hydrogen can be converted to compounds of Formula II wherein $R_1$ is lower alkyl by use of conventional lower alkylating expedients. For example, the compound of Formula II wherein $R_1$ is hydrogen can be converted to a sodio derivative, and this can be treated with a lower alkyl halide or a lower alkyl sulfate. Also, compounds of Formula II wherein $R_1$ is hydrogen can be lower alkanoylated to compounds of Formula II wherein $R_1$ is lower alkanoyl.

Compounds of Formula II can be converted to compounds of Formula III via reduction. The convenient method of effecting this reduction is to use a reducing agent such as lithium aluminum hydride under mild conditions. Preferably, the temperature should be between about −50 °C. and 50° C., for example, at about room temperature. Any conventional inert organic solvents can be used, for example, dioxane, ether, polyalkylene glycol ethers, tetrahydrofuran. When in the starting material compound of Formula II, $R_1$ is lower alkanoyl, stronger conditions (i.e. higher concentrations and/or higher temperatures), as described above, will simultaneously effect removal of said substituent, thus yielding, in one step, compounds of Formula III wherein $R_1$ is hydrogen.

Compounds of Formula III can be used as intermediates for compounds of Formula II, to which they can be converted by oxidation. This oxidation is conveniently effected via use of mercuric oxide as the oxidizing agent.

Compounds of Formula II can be converted to compounds of Formula I wherein $R_2$ is lower alkanoyl or benzoyl by treament with an acid or functional derivative thereof corresponding to the moiety $R_2$. Thus, if it is desired that $R_2$ be lower alkanoyl or benzoyl respectively, the treatment can be effected with, for example, lower alkanoic acid, lower alkanoyl anhydride, or lower alkanoyl halide or benzoic acid, benzoyl anhydride or benzoyl halide. Preferably, the treatment is effected by use of an anhydride, and said reagent can also serve as the reaction medium. Alternatively, an inert organic solvent can be used as the reaction medium. The reaction is suitably effected at elevated temperature up to the reflux temperature of the reaction mixture.

Compounds of Formula I wherein $R_2$ is lower alkanoyl or benzoyl can be converted to compounds of Formula I wherein $R_2$ is hydrogen via hydrolysis. This hydrolysis can be effected with or without isolation of the compound of Formula I wherein $R_2$ is lower alkanoyl or benzoyl. Suitably, this hydrolysis is effected in the presence of alkali. It can be effected at or about room temperature, or elevated temperatures can be used. Compounds of Formula I wherein $R_2$ is hydrogen can serve as intermediates for compounds of Formula I wherein $R_2$ is lower alkanoyl or benzoyl. The latter compounds can be formed from the former compounds via treatment with conventional lower alkanoylating or benzoylating agents.

Compounds of Formula II can be converted to corresponding 2,3-dihydro-5-phenyl-1H-1,4-benzodiazepines by treatment with a reducing agent, such as a phosphorus trihalide, e.g. phosphorus trichloride, or by catalytic hydrogenation in the presence of, for example, Raney nickel.

The novel compounds of this invention are all useful as chemical intermediates as described above, and illustrated in the working examples to follow. Moreover, compounds of Formulae I, II, and III are useful as anticonvulsants. Said compounds and their pharmaceutically acceptable acid addition salts can be administered parenterally or orally (with dosage adjusted to individual requirements) in the form of conventional pharmaceutical preparations, for example, they can be administered in the form of conventional solid pharmaceutical forms such as tablets, capsules, or the like, or they can be in conventional liquid pharmaceutical forms, such as suspensions, emulsions, solutions, or the like.

The following examples are illustrative but not limitative of the invention. All temperatures are stated in ° C.

Example 1

The mixed anhydride of formic acid and acetic acid was prepared by adding 6.8 ml. of 98 percent formic acid to 16.4 ml. of acetic anhydride cooled in an ice bath. This mixture was heated at 50° for 2 hours, cooled and added to a solution of 40 g. of 7 - chloro - 2,3 - dihydro - 5-phenyl - 1H - 1,4 - benzodiazepine in 300 ml. of dichloromethane. This solution was kept at 25° for 17 hours, and then concentrated in vacuo. The residue was treated with aqueous ammonia and ether. The ether phase contained a thick oil which slowly deposited crystals which were recrystallized from a mixture of dichloromethane and petroleum ether yielding 7 - chloro - 2,3 - dihydro - 5-phenyl - 1H - 1,4 - benzodiazepin 1-carboxaldehyde as white prisms melting at 116–119°.

The above mentioned starting material, 7 - chloro - 2,3-dihydro - 5 - phenyl - 1H - 1,4 - benzodiazepine, was prepared as follows:

To a mixture of 6 g. of lithium aluminum hydride and 100 ml. of dry tetrahydrofuran was added in small portions with stirring a solution of 21.6 g. of 7 - chloro-5-phenyl - 3H - 1,4 - benzodiazepin - 2(1H) - one in 300 cc. of dry tetrahydrofuran. The mixture was refluxed until it darkened (about 10 minutes). It was then cooled to room temperature and stirred for an additional 30 minutes. The excess of lithium aluminum hydride was decomposed with ethyl acetate and wet ether. The mixture was filtered over hyflo, the organic layer was separated, dried and concentrated in vacuo. The residue was crystallized from ether and yielded 7 - chloro - 5 - phenyl - 1,2 - dihydro-3H - 1,4 - benzodiazepine which on recrystallization from petroleum ether (B.P. 30–60.) formed yellow needles (melting at 170–71°.

Example 2

Peracetic acid was prepared by dropwise addition of 2.5 ml. of acetic anhydride to a mixture of 3 ml. of dichloromethane, 0.6 ml. of 90 percent hydrogen peroxide and 1 drop of concentrated sulfuric acid at 0°. This mixture was kept in an ice bath for 15 minutes, at 25° for 30 minutes, then added to a solution of 5.3 g. of 7-chloro-2,3 - dihydro - 5 - phenyl - 1H - 1,4 - benzodiazepine-1-carboxaldehyde in 10 ml. of acetic acid and kept at 25° for 17 hours. The solution was then made alkaline by addition of ice and aqueous ammonia. Crystals separated, which after recrystallization from a mixture of dichloromethane and petroleum ether, formed white prisms of 7 - chloro - 2,3,4,9 - tetrahydro - 9 - phenyl - oxazirino

[2,3-d][1,4]benzodiazepin - 4 - carboxaldehyde melting at 148–150°.

Example 3

A sample (1 g.) of 7 - chloro - 2,3,4,9 - tetrahydro-9 - phenyl - oxazirino[2,3-d][1,4]benzodiazepin - 4 - carboxaldehyde was melted in a vial placed in an oil bath kept at 165°. After 3 minutes the dark melt was cooled and on addition of dichloromethane and ether crystallized to yield white prisms of 7 - chloro - 2,3 - dihydro - 5 - phenyl - 1H - 1,4 - benzodiazepin - 1 - carboxaldehyde 4-oxide melting at 148–150°.

The above compound is not only useful as a chemical intermediate and anticonvulsant as disclosed herein, but is also useful as a tranquilizer and muscle relaxant.

Example 4

A solution of 0.3 g. of 7 - chloro - 2,3 - dihydro - 5 - phenyl - 1H - 1,4 - benzodiazepin - 1 - carboxaldehyde 4-oxide in 35 ml. of isopropanol in a Pyrex flask was exposed to the available sunlight for 2 days. A deposit of white prisms of 7 - chloro - 2,3,4,9 - tetrahydro - 9 - phenyl - oxazirino[2,3-d][1,4]benzodiazepin - 4 - carboxaldehyde melting at 148–150° was collected. This sample according to mixed melting point and infrared spectrum was identical to the same compound prepared by Example 2 above.

Example 5

Peracetic acid was prepared by dropwise addition of 6.2 ml. of acetic anhydride to a mixture of 5 ml. of dichloromethane, 1.5 ml. of 90 percent hydrogen peroxide and 1 drop of concentrated sulfuric acid at 0°. This mixture was kept in an ice bath for 15 minutes, at 25° for 30 minutes, then added to a solution of 15 g. of 1-acetyl-7 - chloro - 2,3 - dihydro - 5 - phenyl - 1H - 1,4 - benzodiazepine in 30 ml. of acetic acid. (No cooling necessary). The reaction mixture was allowed to stand overnight at 25° then basified with aqueous ammonia (ice) and extracted with dichloromethane. This extract after concentration and addition of ether gave crystals of 4 - acetyl-7 - chloro - 2,3,4,9 - tetrahydro - 9 - phenyl - oxazirino [2,3-d][1,4]benzodiazepine melting at 159–161°.

The above mentioned starting material 1-acetyl-7-chloro-2,3-dihydro-5-phenyl-1H-1,4-benzodiazepine, was prepared as follows:

A solution of 1 g. of 7-chloro-5-phenyl-2,3-dihydro-1H-1,4-benzodiazepine in a mixture of 15 ml. of pyridine and 10 cc. of acetic anhydride was left at room temperature for 5 hours and then concentrated in vacuo to dryness. The residue was crystallized from ether and yielded 1-acetyl-7-chloro-5-phenyl-2,3-dihydro-1H - 1,4 - benzodiazepine which on recrystallization from a mixture of methylene chloride, ether and petroleum ether formed colorless prisms melting at 165–6°.

Example 6

A solution of 0.3 g. of 1-acetyl-7-chloro-2,3-dihydro-5-phenyl-1H-1,4-benzodiazepine 4-oxide was dissolved in 35 ml. of isopropanol in a Pyrex flask and exposed to the available sunlight for 24 hours. A crystalline deposit of 4 - acetyl - 7-chloro-2,3,4,9-tetrahydro-9-phenyl-oxazirino[2,3-d][1,4]benzodiazepine was obtained, which gave a mixed melting point of 159–161° with the same material prepared in Example 5 above.

Example 7

13.2 g. of 4-acetyl-7-chloro-2,3,4,9-tetrahydro-9-phenyl-oxazirino[2,3-d][1,4]benzodiazepine was heated in a flask immersed in an oil bath (bath temperature ca. 170°) for 5 minutes. After cooling the solidified melt was recrystallized from a mixture of dichloromethane and petroleum ether to yield white prisms of 1-acetyl-7-chloro-2,3-dihydro-5-phenyl-1H-1,4-benzodiazepine 4-oxide melting at 216–218°.

Example 8

A solution of 12.6 g. of 1-acetyl-7-chloro-2,3-dihydro-5-phenyl-1H-1,4-benzodiazepine 4-oxide in 250 ml. dry tetrahydrofuran was added at 15° to a solution of 0.76 g. of lithium aluminum hydride in 100 ml. of dry tetrahydrofuran. The solution was kept at 15–20° for 1 hour, diluted with ether and after addition of 4 ml. of water, filtered. The solvent contained an oil which was dissolved in benzene and adsorbed on a column containing 350 g. of neutral alumina (Woelm, grade 1). Elution with a mixture of dichloromethane and ethyl acetate (1:2) gave 0.6 g. of starting material in the first fractions. Later fractions gave oils which crystallized on standing, and were recrystallized from a mixture of dichloromethane and ether to give white prisms of 1-acetyl-7-chloro-2,3,4,5-tetrahydro-5-phenyl-1H-1,4-benzodiazepine-4-ol melting at 159–161°.

The above compound is not only useful as a chemical intermediate and anticonvulsant as disclosed herein, but is also useful as a muscle relaxant.

Example 9

A solution of 0.3 g. of 1-acetyl-7-chloro-2,3,4,5-tetrahydro-5-phenyl-1H-1,4-benzodiazepin-4-ol in 6 ml. of acetone and 1 ml. of water was stirred with 0.7 g. of mercuric oxide at 25° for 1 hour. After addition of dichloromethane the solids were removed by filtration, and the organic phase was concentrated to yield crystals of 1-acetyl-7-chloro-2,3-dihydro-5-phenyl-1H - 1,4 - benzodiazepine 4-oxide which after recrystallization from ether gave a mixed melting point of 216–217° with a sample of the same substance made by Example 7 above.

Example 10

A solution of 12.6 g. of 1-acetyl-7-chloro-2,3-dihydro-5-phenyl-1H-1,4-benzodiazepine 4-oxide in 250 ml. of dry tetrahydrofuran was added to a solution of 1.52 g. of lithium aluminum hydride in 100 ml. of dry tetrahydrofuran. The temperature of the solution rose to 28°. After stirring for 1 hour at room temperature, ether and 7 ml. of water were added. Filtration and evaporation of the solution gave white prisms of 7-chloro-2,3,4,5-tetrahydro-5-phenyl-1H-1,4-benzodiazepin-4-ol which after recrystallization from a mixture of ether and hexane melted at 165–167°.

Example 11

A solution containing 16 g. of 1-acetyl-7-chloro-2,3-dihydro-5-phenyl-1H-1,4-benzodiazepine 4-oxide in 250 ml. of methanol and 75 ml. of 2 N aqueous sodium hydroxide was refluxed for 2 hours. Concentration of the solution gave yellow needles of 7-chloro-2,3-dihydro-5-phenyl-1H-1,4-benzodiazepine 4-oxide which after recrystallization from methanol melted at 240–243°.

Example 12

A solution of 0.2 g. of 7-chloro-2,3-dihydro-5-phenyl-1H-1,4-benzodiazepin-1-carboxaldehyde 4-oxide in methanol containing 2 N aqueous sodium hydroxide was kept on the steam bath for 10 minutes. A yellow precipitate of 7 - chloro-2,3-dihydro-5-phenyl-1H-1,4-benzodiazepine 4-oxide resulted, and gave a mixed melting point of 241–243° with a sample of same compound prepared by Example 11 above.

Example 13

A solution of 0.3 g. of 7-chloro-2,3,4,5-tetrahydro-5-phenyl-1H-1,4-benzodiazepin-4-ol in 6 ml. of acetone and 1 ml. of water was stirred for 30 minutes at 25° with 0.7 g. of mercuric oxide. Dichloromethane was added and the solution was filtered and concentrated to give yellow crystals of 7-chloro-2,3-dihydro-5-phenyl-1H-1,4-benzodiazepine 4-oxide, which gave a mixed melting point of 240–242° with the same compound prepared by Example 11 above.

Example 14

To a cooled mixture of 13.6 ml. of 98 percent formic acid and 32.8 ml. acetic anhydride which had been kept at 50° for 2 hours was added 12.6 g. of 7-chloro-2,3-dihydro-5-phenyl-1H-1,4-benzodiazepine 4-oxide. A red solution formed which after standing for 20 minutes at 25° turned yellow and was made alkaline by addition of ice and aqueous ammonia. Extraction with dichloromethane and recrystallization from a mixture of dichloromethane and hexane yielded white prisms which upon recrystallization from a mixture of dichloromethane and ether yielded colorless prisms of 7-chloro-2,3-dihydro-5-phenyl-1H-1,4-benzodiazepin-1-carboxaldehyde 4-oxide melting at 148–151°.

Example 15

A solution of 2.7 g. of 7-chloro-2,3-dihydro-5-phenyl-1H-1,4-benzodiazepine 4-oxide in 50 ml. of dimethylformamide was cooled, and 1.8 ml. of acetyl chloride was added thereto. A red solution was formed, kept at 25° for 2 hours, and concentrated in vacuo to give an oil which on addition of water crystallized. Recrystallization from methanol yielded white prisms melting at 214–217°, which gave a mixed melting point of 214–217° with the same substance prepared by Example 7 above.

Example 16

A solution of 0.15 g. of 7-chloro-2,3-dihydro-5-phenyl-1H-1,4-benzodiazepine 4-oxide in 7 ml. of chloroform containing 0.25 ml. of phosphorus trichloride was refluxed for 30 minutes. The mixture was cooled, poured on ice, made basic with aqueous sodium hydroxide and extracted with dichloromethane. Evaporation gave yellow flakes of 7-chloro-2,3-dihydro-5-phenyl - 1H - 1,4 - benzodiazepine which after recrystallization from ether melted at 169–171°.

Example 17

A solution of 5 g. of 7-chloro-2,3-dihydro-5-phenyl-1H-1,4-benzodiazepin-1-carboxaldehyde 4-oxide in 50 ml. of acetic anhydride was refluxed for 5 hours, then left at 25° for 17 hours. After evaporation of the acetic anhydride in vacuo the residue crystallized on addition of ether to give white prisms of 3-acetoxy-7-chloro-2,3-dihydro-5-phenyl-1H-1,4-benzodiazepin-1 - carboxaldehyde which after recrystallization from a mixture of dichloromethane and ether, melted at 165–167°.

Example 18

A solution of 7.0 g. of 1-acetyl-7-chloro-2,3-dihydro-5-phenyl-1H-1,4-benzodiazepine 4-oxide in 60 ml. of acetic anhydride was refluxed for 7 hours. After evaporation of the acetic anhydride in vacuo the residue on addition of ether gave crystals, which after recrystallization from a mixture of dichloromethane and hexane, yielded white prisms of 3 - acetoxy - 1 - acetyl-7-chloro-2,3-dihydro-5-phenyl-1H-1,4-benzodiazepine melting at 176–178°.

Example 19

To a solution of 1.78 g. of 3-acetoxy-1-acetyl-7-chloro-2,3-dihydro-5-phenyl-1H-1,4-benzodiazepine in 50 ml. of methanol, 10 ml. of 1 N aqueous sodium hydroxide was added dropwise over a period of 10 minutes. The solution was then concentrated in vacuo without heating, and extracted with dichloromethane. On concentration of the dichloromethane and addition of ether, white prisms of 1 - acetyl - 7 - chloro - 2,3 - dihydro-5-phenyl-1H-1,4-benzodiazepin-3-ol were obtained which melted at 165–167° (dec.).

Example 20

A solution of 0.05 g. of 1-acetyl-7-chloro2,3-dihydro-5-phenyl-1H-1,4-benzodiazepin-3-ol in 2 ml. of acetic anhydride was kept at 25° for 17 hours. The acetic anhydride was evaporated in vacuo and the residue crystallized from ether to give white prisms of 3-acetoxy-1-acetyl-7-chloro-2,3-dihydro-5-phenyl - 1H - 1,4 - benzodiazepine melting at 171–176° which gave a mixed melting point of 171–176° with a sample of the same substance prepared by Example 18 above.

Example 21

A solution of 5.4 g. of 7-chloro-2,3-dihydro-5-phenyl-1H-1,4-benzodiazepin 4-oxide in 100 ml. of dimethylformamide was prepared under dry nitrogen. To this solution 3.18 g. of a 50 percent suspension of sodium hydride in mineral oil was added with stirring, and the bath temperature was raised to about 50°. After one hour the mixture was cooled in an ice bath and 6 ml. of methyl iodide was added thereto. The solution was kept at 25° for 18 hours, and then poured into ice water. After extraction with dichloromethane an oil was obtained which crystallized on addition of a mixture of ether and petroleum ether to give crystals of 7 - chloro-2,3-dihydro-1-methyl-5-phenyl-1H-1,4-benzodiazepin 4-oxide which upon recrystallization from a mixture of dichloromethane and petroleum ether, yielded yellow prisms melting at 139–142°. The above compound is not only useful as a chemical intermediate and anticonvulsant as disclosed herein, but is also useful as a tranquillizer.

Example 22

A solution of 3.1 g. of 7-chloro-2,3-dihydro-1-methyl-5-phenyl-1H-1,4-benzodiazepin 4-oxide in 20 ml. of acetic anhydride was refluxed for 70 minutes. The brown solution was concentrated in vacuo, the residue was dissolved in benzene and placed on a column containing 90 g. aluminum oxide (Woelm neutral, activity grade 2). Elution with ethyl acetate gave crystals which after recrystallization from a mixture of methylene chloride and petroleum ether yielded light yellow prisms of 7-chloro-2,3-dihydro-1-methyl-5-phenyl-1H-1,4-benzodiazepin-3 - ol melting at 155–156° (dec.).

We claim:
1. A compound selected from the group consisting of compounds of the formula

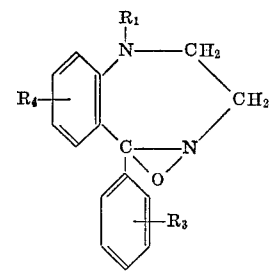

and acid addition salts thereof
wherein $R_1$ is selected from the group consisting of lower alkyanoyl, lower alkyl, and hydrogen; $R_2$ is selected from the group consisting of hydrogen, lower alkyl, halogen, trifluoromethyl and nitro; and $R_4$ is selected from the group consisting of hydrogen, lower alkyl, halogen, trifluoromethyl, nitro and cyano.

References Cited

Sternbach, L. H. et al., Jour. Org. Chem. vol. 27, December 1962, pp. 4671–2.

NORMA S. MILESTONE, Primary Examiner

U.S. Cl. X.R.

260—999, 239 BD

UNITED STATES PATENT OFFICE
CERTIFICATE OF CORRECTION

Patent No. 3,644,419         Dated February 22, 1972

Inventor(s) Metlesics and Sternbach

It is certified that error appears in the above-identified patent and that said Letters Patent are hereby corrected as shown below:

Column 8, line 58 of claim 1

" lower alkyanoyl, lower alkyl, and hydrogen; R2 is "

should be lower alkanoyl, lower alkyl, and hydrogen; $R_3$ is

Signed and sealed this 29th day of August 1972.

(SEAL)
Attest:

EDWARD M. FLETCHER, JR.
Attesting Officer

ROBERT GOTTSCHALK
Commissioner of Patents